United States Patent [19]

Niles

[11] Patent Number: 5,420,593
[45] Date of Patent: May 30, 1995

[54] METHOD AND APPARATUS FOR ACCELERATING CODE CORRELATION SEARCHES IN INITIAL ACQUISITION AND DOPPLER AND CODE PHASE IN RE-ACQUISITION OF GPS SATELLITE SIGNALS

[75] Inventor: Michael P. Niles, Menlo Park, Calif.

[73] Assignee: Trimble Navigation Limited, Sunnyvale, Calif.

[21] Appl. No.: 45,582

[22] Filed: Apr. 9, 1993

[51] Int. Cl.⁶ .......................... H04B 7/185; G01S 5/02
[52] U.S. Cl. ...................................................... 342/357
[58] Field of Search ................ 342/357; 455/12.1, 13.2

[56] References Cited

U.S. PATENT DOCUMENTS

| | | | |
|---|---|---|---|
| 4,821,294 | 4/1989 | Thomas, Jr. | 342/352 |
| 4,847,862 | 7/1989 | Braisted et al. | 375/1 |
| 5,101,416 | 3/1992 | Fenton et al. | 342/357 |
| 5,274,667 | 12/1993 | Olmstead | 375/1 |

*Primary Examiner*—Theodore M. Blum
*Attorney, Agent, or Firm*—Thomas E. Schatzel

[57] ABSTRACT

An embodiment of the present invention is a GPS receiver comprising a GPS downconverter, a fast acquisition unit, a GPS digital signal processor (DSP), a static random access memory (SRAM) and a temperature compensated crystal oscillator (TCXO). The fast acquisition unit samples intermediate frequency signals from the GPS downconverter at 5.17 MHz and writes the samples to the SRAM memory. The memory then supplies the samples back out at a rate of 10.34 MHz. The GPS DSP is such that PRN code and code phase searches are conducted at two times the real-time transmission rate of a GPS satellite. Once a code lock is obtained, Doppler, code, code phase and ephemeris data are stored by a GPS processor. If lock is lost, past code phase and Doppler are projected forward in time using ephemeris and other relevant GPS satellite knowledge to constrain a new search to re-establish lock.

10 Claims, 4 Drawing Sheets

METHOD AND APPARATUS FOR ACCELERATING CODE CORRELATION SEARCHES IN INITIAL ACQUISITION AND DOPPLER AND CODE PHASE IN RE-ACQUISITION OF GPS SATELLITE SIGNALS

BACKGROUND OF THE INVENTION

1. Field of the Invention

The invention relates generally to navigation systems and more specifically to methods and apparatus in global positioning system (GPS) devices that accelerate initial GPS satellite signal acquisition and reacquisition.

2. Description of the Prior Art

Global positioning system receivers use signals received from typically three or more overhead satellites to determine navigational data such as position and velocity. Such systems may also provide altitude and time. GPS signals are available worldwide at no cost and can be used to determine the location of a vehicle, such as a car or truck, to within one city block, or better. Dual-frequency carrier GPS receivers typically track a pair of radio carriers, L1 and L2, associated with the GPS satellites, to generate accumulated delta-range measurements (ADR) from P-code modulation on those carriers and at the same time track L1 coarse acquisition code (C/A-code) to generate code phase measurements. Carrier L1 is positioned at 1575.42 MHz and carrier L2 is positioned at 1227.78 MHz. Less expensive receivers tune only one carrier frequency, and therefore cannot compute for themselves the local ionospheric delays that will appear as position errors. At such carrier frequencies, radio carriers travel by line-of-sight.

The constellation of GPS satellites in orbit about the earth comprises individual satellites that each transmit a unique identifying code in a code multiple access arrangement (CDMA). This allows the many GPS satellites to all transmit in spread spectrum mode at the same frequency (plus or minus a Doppler shift of that frequency as results from the satellite's velocity). Particular satellites are sorted out of the jumble of signals and noise by correlating a 1023 "chip" code to a set of predefined codes that are matched to individual GPS satellites. These codes can be out of phase with one another. Therefore, "finding" a GPS satellite initially involves searching various carrier frequencies, to account for Doppler shift and oscillator inaccuracies, and search for a code match, using 1023 different code phases and twenty or more code templates.

In large cities with many tall buildings, one or more of the GPS satellites a particular receiver may be tracking can be temporarily blocked. When the GPS signal reappears, the Doppler frequency may be different than before and code phase may have drifted. Therefore a delay in gathering useful information will be experienced while the GPS receiver re-establishes lock.

A receiver that had a lock on a GPS satellite signal and lost the lock can use information about the satellite gathered during lock to predict what carrier frequencies and code phases are most likely to re-establish lock. Such predictions may be used to constrain a search and therefore takes less time to conduct the search.

SUMMARY OF THE PRESENT INVENTION

It is therefore an object of the present invention to provide a system and method for accelerating code correlations by conducting code and code phase searches at faster than real-time rates.

It is another object of the present invention to provide a system and method for using GPS satellite ephemeris data and code phase gathered while a receiver has a lock of a GPS satellite signal to constrain and thus speed up a new search conducted to re-establish lock once lock has been broken.

Briefly, a preferred embodiment of the present invention is a GPS system with accelerated search capability comprising a GPS receiver, a correlation code accelerator, a code correlator and GPS processor. The correlation code accelerator samples detected signals from the GPS receiver and writes the samples to a memory. The memory then supplies the samples at a rate two times the rate that they were gathered to the code correlator. The code correlator is such that code and code phase searches are conducted at two times the real-time transmission rate of a GPS satellite. Once lock is obtained, Doppler, code, code phase and ephemeris data are stored by the GPS processor. If lock is lost, past code phase and Doppler are projected forward in time using ephemeris and other relevant GPS satellite knowledge to constrain a new search to re-establish lock.

An advantage of the present invention is that it provides a system and method of accelerating an initial locking-on to GPS satellite signals.

Another advantage of the present invention is that a system and method is provided that reduce the time delay to re-establish GPS signal lock.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
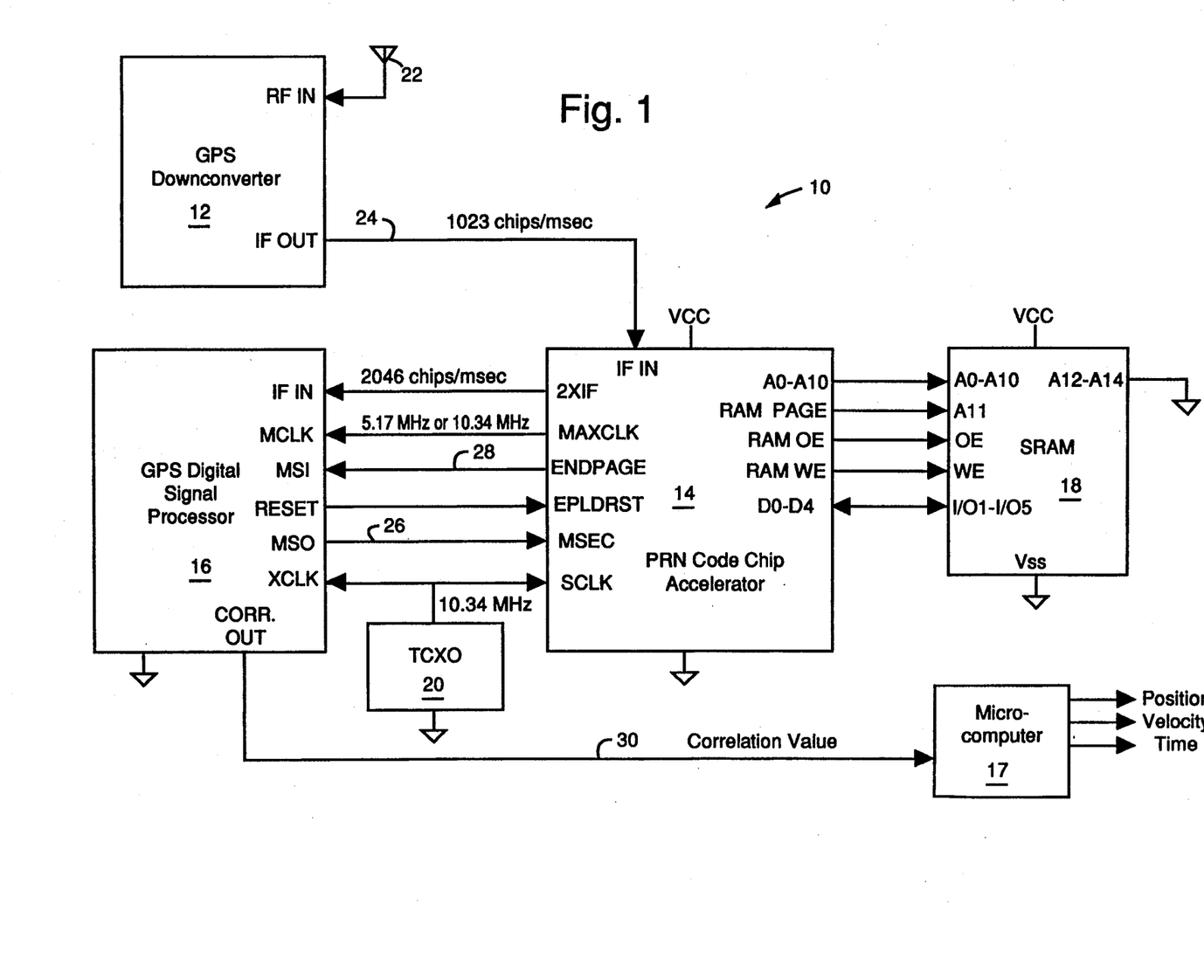
FIG. 1 is a block diagram of a GPS receiver system embodiment of the present invention.

FIG. 1 illustrates a GPS receiver system embodiment of the present invention, referred to by the general reference numeral 10. System 10 comprises a global position system (GPS) downconverter 12, a pseudo random number (PRN) code chip accelerator 14, a GPS digital signal processor (DSP) 16, a microcomputer 17, a 16K-byte static random access memory (SRAM) 18, and a temperature compensated crystal oscillator (TCXO) 20. An antenna 22 is connected to an input of GPS downconverter 12.

In operation, a plurality of radio frequency (RF) carrier signals from GPS satellite vehicles (SVs) are received by antenna 22 and input to GPS downconverter 12. Such signals are allocated to be 1575.42 MHz for carrier signal L1 and 1227.78 MHz for carrier signal L2. In order to acquire and track a particular GPS SV, GPS downconverter 12 is operated to find a Doppler influenced GPS carrier frequency. GPS DSP is operated to find an associated code division multiple access (C/A) code phase from the GPS SV. Typically, a search will cover a range of frequencies, a range that can be widened by local oscillator uncertainties when first starting up. A range of 1023 code phases will be searched by GPS DSP 16, chip-by-chip, until a signal from the expected GPS SV is found. If the expected GPS SV is not found, C/A codes for other likely candidates are tried. This search is carried out by mixing a received signal with various local oscillator frequencies in a super-heterodyne fashion and correlating a detected signal with a trial C/A code that is predicted to be valid for the locale.

The code correlation interval is conventionally one millisecond, which is the periodicity of the C/A code. After an initial detection of a GPS signal, a phase lock loop is used to help bring it in to a full tracking condition. The success of the phase lock loop and the phase lock loop delay are dependent upon bringing the signal close enough to a pseudo-baseband via a carrier numerically controlled oscillator (NCO), and being close enough to an actual peak in C/A code phase. After a satellite signal is acquired, lock may be temporarily lost due to some physical obstruction between the receiver and the satellite, e.g. the user drives by a very tall building. Rather than resuming a search over a range of code phases, it is possible to use information from the last lock to predict the new code phase. This makes for fast re-acquisition once the obstruction is out of the way. However, such concerns and their solutions are conventional and well documented in the background art which a person skilled in the art will be conversant. Therefore, further details of the GPS downconverter 12 and GPS DSP 16 are unnecessary here.

PRN code chip accelerator 14 doubles the speed at which GPS DSP 16 can search through the PRN codes from the GPS SVs. Essentially, PRN codes at the normal rate of 1023 chips per millisecond are embedded in an intermediate frequency output (IF OUT) signal 24 produced by GPS downconverter 12. For a six-channel GPS receiver, GPS DSP 16 can produce one correlation value for each channel, each millisecond. Initially, the PRN code phase will be unknown, since the code phase itself is one of the objects of the search to obtain a first fix. Therefore, the IF OUT signal 24 is digitally sampled by PRN code chip accelerator 14 at a fast enough rate to guarantee that no PRN code information will be lost by the sampling process. A rate of 1023 chips per millisecond is 1.023 MHz. Since TCXO 20 outputs a reference frequency of 10.34 MHz, half of that frequency, or 5.17 MHz would allow a sampling rate of a little more than five samples per chip. Other sample rates can be used, and the present invention is not limited to any one particular sample rate. However, at a rate of 5.17 MHz, 5170 single-bit samples will be collected each millisecond. The number 5170 is evenly divisible by five, e.g., 1034. Therefore, it is convenient to store the collected samples in five bit words. The present invention is not limited to five bit words, other word sizes are appropriate and useful, especially at sampling rates other than 5.17 MHz.

PRN code chip accelerator 14 then converts a 5.17 MHz stream of serial one-bit samples into parallel words of five bits and stores each five-bit word as it is converted into a memory storage address within SRAM 18. For example, the first such five-bit word is stored at address zero within SRAM 18. The second such five-bit word is stored at the next address, address one. Each new five-bit word will be ready to store every 1023+5 chip periods, or 4.887 microseconds. PRN code chip accelerator 14 sequences SRAM 18 through 1034 addresses and then selects a new page of 1034 addresses by toggling an address line A11. Therefore, each page will store 5170 samples, or one millisecond worth of data. To support an output (2XIF) at twice the normal IF rate, a page of 5170 samples is read out twice serially to GPS DSP 16 in a single millisecond. That is a rate of 10.34 MHz.

The so-called epoch in the PRN code occurs every millisecond in real-time. An epoch will occur in both memory PAGE A and PAGE B at any of the 5170 samples written at any one of the 1034 addresses used with SRAM 18.

GPS DSP 16 issues a millisecond (MSO) signal that is conventionally provided in background art devices. The MSO signal is related to a time base for a set of correlators that operate within GPS DSP 16. A millisecond (MSEC) signal 26 is input to PRN code chip accelerator 14 to synchronize a readback of the samples stored in SRAM 18 at double the real-time rate. For example, the MSEC signal 26 can be used to reset addresses A0–A10 of SRAM 18 to zero every millisecond, in phase with the correlation of GPS DSP 16. Address A11 is used to choose between PAGE A and PAGE B. SRAM 18 is sequentially read at 2.068 MHz. Each read produces a five-bit word, therefore 10340 samples per millisecond are output from 2XIF. Each time 5170 samples is completed, an end-of-page (ENDPAGE) signal 28 is output to a millisecond input (MSI) clock of GPS DSP 16. The reading back of the 5170 samples every half of a millisecond is thus phase locked to the correlations occurring within GPS DSP 16.

The MSI clock input is thus fed a half-millisecond clock, two times its normal input. All the correlation operations within GPS DSP 16 are clocked by the MSI input. Therefore, GPS DSP 16 is able to search through the PRN codes looking for correlation peaks at twice the conventional rate. Searches thus require about half the usual time to complete. Each correlation each half millisecond for each of six channels produces an interrupt to microcomputer 17 via a correlation value signal 30. At such rates, microcomputer 17 approaches full utilization and can become CPU-bound at higher correlation value rates.

Although GPS receiver system 10 may be limited to the doubling of PRN code rates by PRN code chip accelerator 14, the present invention is not so limited. Tripling and quadrupling the rates would be feasible if concomitant speed improvements were made in GPS DSP 16 and microcomputer 17.

Figure 2:
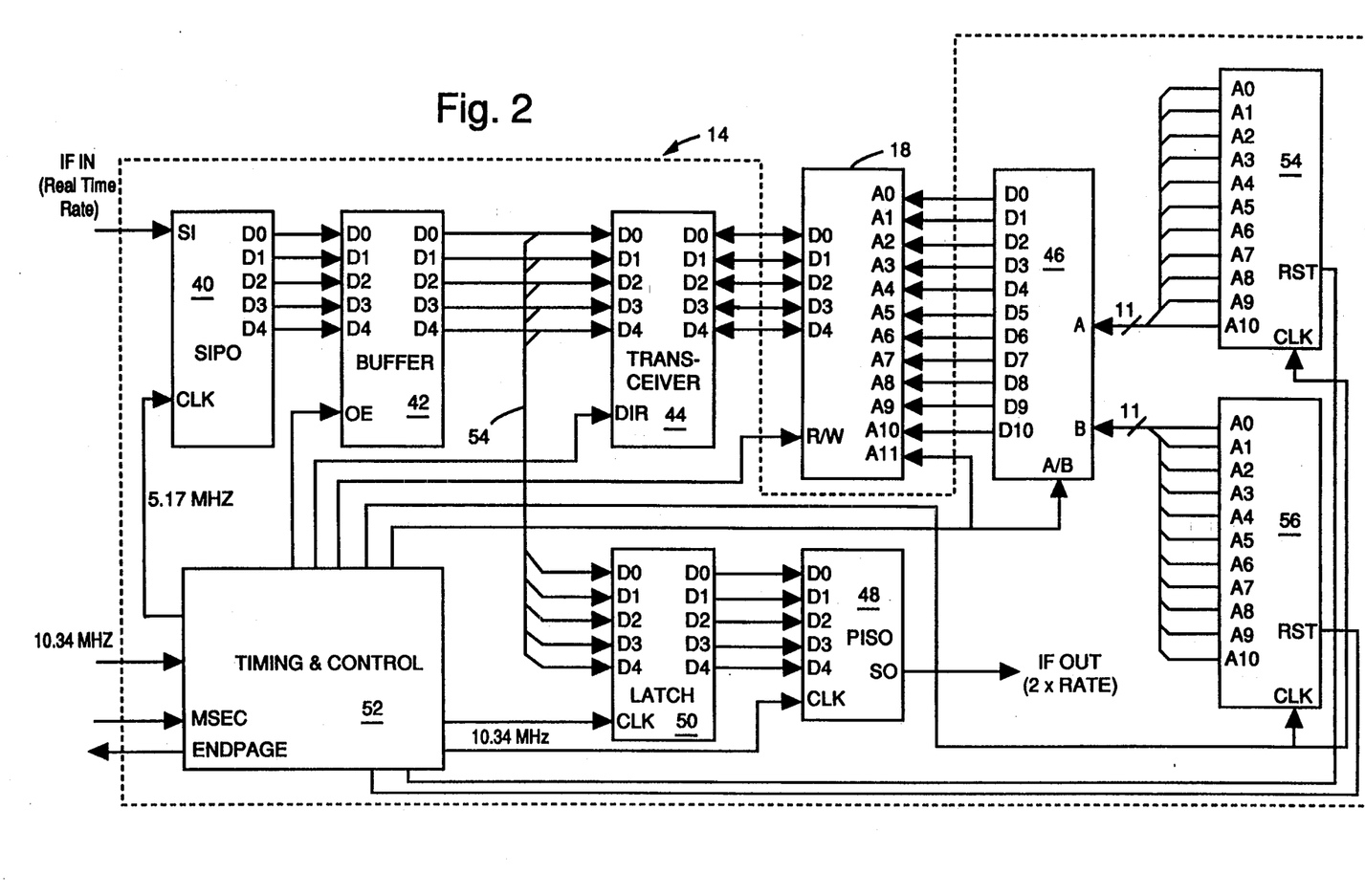
FIG. 2 is a functional block diagram of the code chip accelerator and RAM of the system of FIG. 1.

FIG. 2 shows PRN code chip accelerator 14 is functionally comprised of a serial-in to parallel-out (SIPO) shift register (SR) 40, a bus buffer 42, a bus transceiver 44, an eleven-by-two (11×2) multiplexor 46, a parallel-in to serial-out (PISO) shift register (SR) 48, a latch 50, a timing/control unit 52, a read address counter 54 and a write address counter 56. Real-time IF input from GPS downconverter 12 is input to SIPO SR 40 at a serial input port SI. A 5.17 MHz clock from timing/control unit 52 causes SIPO SR 40 to sample and shift the SI port once each cycle. After five cycles have been completed, buffer 42 is enabled by timing/control unit 52 and the five-bit sample word is driven onto a bus 54. Timing/control unit 52 then causes transceiver 44 to send data from bus 54 in the direction of SRAM 18, where it is written. The locations within SRAM 18 that are accessed are controlled by address counter 54 or 56. The MSEC signal input at timing/control unit 52 will basically reset address counters 54 and 56 to zero each millisecond. For every one location in SRAM 18 that is written by the input stream of samples, two word locations are read back out. Every fifth cycle of the 10.34 MHz input clock will cause timing/control unit 52 to turn transceiver 44 around to drive data from SRAM 18 onto bus 54. Timing/control unit 52 signals SRAM 18 to do a read operation. Latch 50 is clocked to strobe in the data and hold it for PISO SR 48. The 10.34 MHz clock is used to shift out the samples serially at the 10.34 MHz rate.

Figure 3:
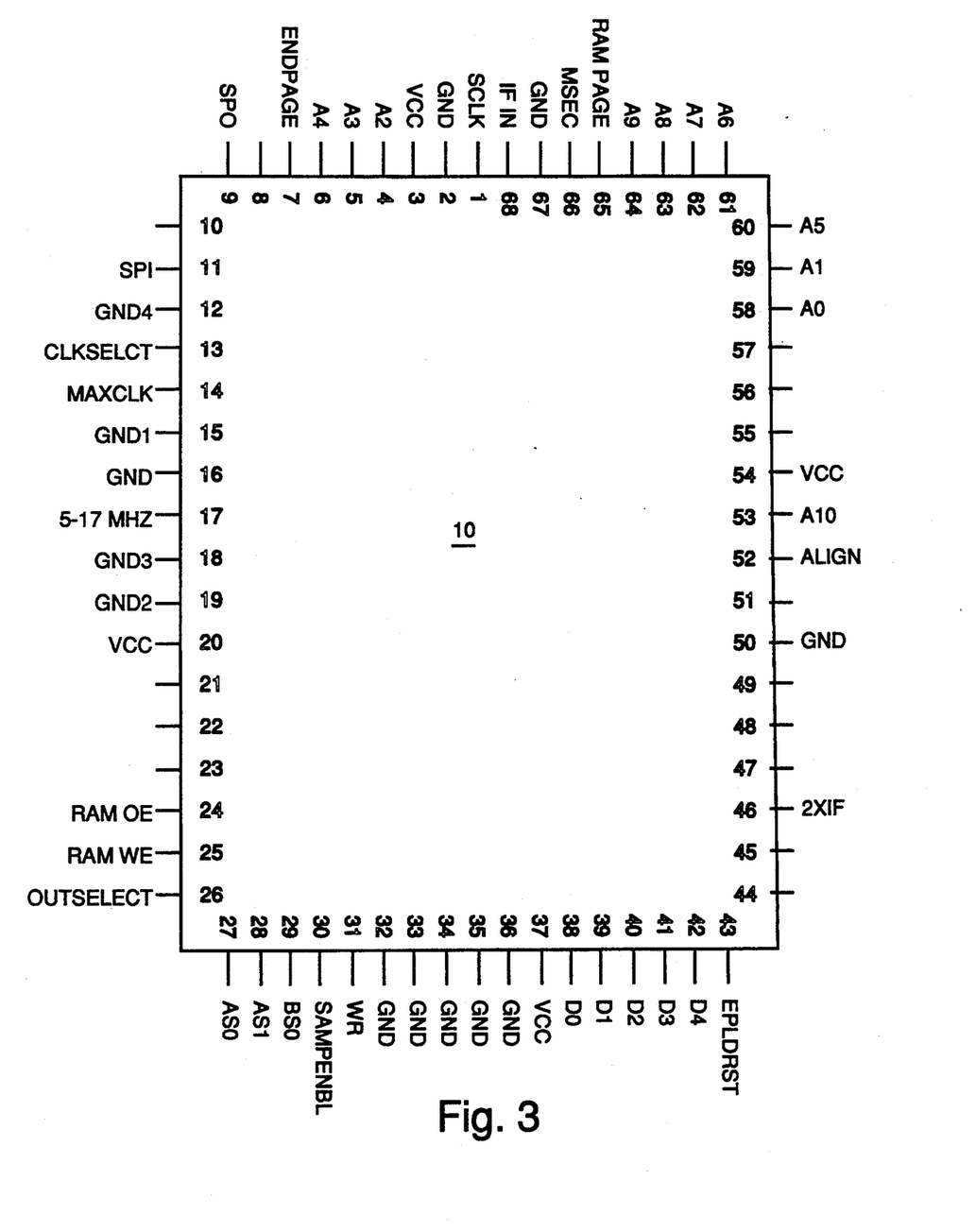
FIG. 3 is pin-out diagram of the code chip accelerator and RAM of the system of FIG. 1 as implemented in a commercially available electronically programmable logic device.

FIG. 3 illustrates a pin-out of an integrated circuit that was used to implement PRN code chip accelerator 14. For example, an electronically-programmable logic device (EPLD) can be used. The inventor has used an Altera EPM5128-2 device with good results. SRAM 18 may be a SRM20256LCT12, which is a commercially available memory. Tables I and II summarize the pin-outs of PRN code chip accelerator 14, implemented with the EPM5128-2, and SRAM 18, when implemented with the SRM20256LCT12 memory.

TABLE I

| Pin | Name | Connection | Comment |
|---|---|---|---|
| 1 | SCLK | INPUT: from TCXO 20 | master clock |
| 2 | GND | GND | |
| 3 | VCC | VCC | |
| 4 | A2 | OUTPUT: to pin 8 of SRAM 18 | SRAM 18 address line |
| 5 | A3 | OUTPUT: to pin 7 of SRAM 18 | SRAM 18 address line |
| 6 | A4 | OUTPUT: to pin 6 of SRAM 18 | SRAM 18 address line |
| 7 | ENDPAGE | OUTPUT: to pins 73 and 116 of GPS downconverter 12 | SP13 and MSI |
| 8 | | n/c | |
| 9 | SP0 | OUTPUT: to GPS downconverter 12 | SP17 |
| 10 | | n/c | |
| 11 | SP1 | INPUT: from GPS downconverter 12 | SP07 |
| 12 | GND4 | INPUT: GND | |
| 13 | CLKSELCT | INPUT: from GPS downconverter 12 | SP05 |
| 14 | MAXCLK | OUTPUT: to GPS downconverter 12 | MCLK |
| 15 | GND1 | INPUT: GND | |
| 16 | GND | GND | |
| 17 | 5-17 MHz | n/c | Test output |
| 18 | GND3 | INPUT: GND | |
| 19 | GND2 | INPUT: GND | |
| 20 | VCC | VCC | |
| 21 | | n/c | |
| 22 | | n/c | |
| 23 | | n/c | |
| 24 | RAM OE | OUTPUT: to pin 22 of SRAM 18 | SRAM 18 Output enable |
| 25 | RAMWE | OUTPUT: to pin 27 of SRAM 18 | SRAM 18 write enable |
| 26 | OUTSELECT | n/c | Test output |
| 27 | AS0 | n/c | Test output |
| 28 | AS1 | n/c | Test output |
| 29 | BS0 | n/c | Test output |

TABLE I-continued

| Pin | Name | Connection | Comment |
|---|---|---|---|
| 30 | SAMPENBL | n/c | Test output |
| 31 | WA DRIVE | n/c | Test output |
| 32 | GND | GND | |
| 33 | GND | GND | |
| 34 | GND | GND | |
| 35 | GND | GND | |
| 36 | GND | GND | |
| 37 | VCC | VCC | |
| 38 | D0 | I/O: pin 11 of SRAM 18 | SRAM 18 data line |
| 39 | D1 | I/O: pin 12 of SRAM 18 | SRAM 18 data line |
| 40 | D2 | I/O: pin 13 of SRAM 18 | SRAM 18 data line |
| 41 | D3 | I/O: pin 15 of SRAM 18 | SRAM 18 data line |
| 42 | D4 | I/O: pin 16 of SRAM 18 | SRAM 18 data line |
| 43 | EPLDRST | INPUT: from pin 83 of downconverter | SP06 |
| 44 | | n/c | |
| 45 | | n/c | |
| 46 | 2XIF | OUTPUT: to GPS downconverter 12 | 152 and Q22 |
| 47 | | n/c | |
| 48 | | n/c | |
| 49 | | n/c | |
| 50 | GND | GND | |
| 51 | | n/c | |
| 52 | ALIGN | n/c | Test output |
| 53 | A10 | OUTPUT: to pin 21 of SRAM 18 | SRAM 18 address line |
| 54 | VCC | VCC | |
| 55 | | n/c | |
| 56 | | n/c | |
| 57 | | n/c | |
| 58 | A0 | OUTPUT: to pin 10 of SRAM 18 | SRAM 18 address line |
| 59 | A1 | OUTPUT: to pin 9 of SRAM 18 | SRAM 18 address line |
| 60 | A5 | OUTPUT: to pin 5 of SRAM 18 | SRAM 18 address line |
| 61 | A6 | OUTPUT: to pin 4 of SRAM 18 | SRAM 18 address line |
| 62 | A7 | OUTPUT: to pin 3 of SRAM 18 | SRAM 18 address line |
| 63 | A8 | OUTPUT: to pin 25 of SRAM 18 | SRAM 18 address line |
| 64 | A9 | OUTPUT: to pin 24 of SRAM 18 | 24 of SRAM 18 |
| 65 | RAM PAGE | OUTPUT: to pin 23 of SRAM 18 | SRAM 18 address line |
| 66 | MSEC | INPUT: from GPS downconverter 12 | MSEC |
| 67 | GND | GND | |
| 68 | IF IN | INPUT: from GPS downconverter 12 | |

TABLE II
CONNECTIONS TO SRAM 18

| Pin | Name | Connection | Comment |
|---|---|---|---|
| 1 | A14 | INPUT: grounded | unused address line |
| 2 | A12 | INPUT: grounded | unused address line |

TABLE II-continued
CONNECTIONS TO SRAM 18

| Pin | Name | Connection | Comment |
|---|---|---|---|
| 3 | A7 | INPUT: from pin 62 of PRN code chip accelerator 14 | address line A7 |
| 4 | A6 | INPUT: from pin 61 of PRN code chip accelerator 14 | address line A6 |
| 5 | A5 | INPUT: from pin 60 of PRN code chip accelerator 14 | address line A5 |
| 6 | A4 | INPUT: from pin 6 of PRN code chip accelerator 14 | address line A4 |
| 7 | A3 | INPUT: from pin 5 of PRN code chip accelerator 14 | address line A3 |
| 8 | A2 | INPUT: from pin 4 of PRN code chip accelerator 14 | address line A2 |
| 9 | A1 | INPUT: from pin 59 of PRN code chip accelerator 14 | address line A1 |
| 10 | A0 | INPUT: from pin 58 of PRN code chip accelerator 14 | address line A0 |
| 11 | I/O1 | I/O: pin 38 of PRN code chip accelerator 14 | D0 |
| 12 | I/O2 | I/O: pin 39 of PRN code chip accelerator 14 | D1 |
| 13 | I/O3 | I/O: pin 40 of PRN code chip accelerator 14 | D2 |
| 14 | VSS | GND | GND |
| 15 | I/O4 | I/O: pin 41 of PRN code chip accelerator 14 | D3 |
| 16 | I/O5 | I/O: pin 42 of PRN code chip accelerator 14 | D4 |
| 17 | I/O6 | I/O: No connection. Leave floating | unused data line |
| 18 | I/O7 | I/O: No connection. Leave floating | unused data line |
| 19 | I/O8 | I/O: No connection. Leave floating | unused data line |
| 20 | CS | INPUT: from pin of PRN code chip accelerator 14 | ground |
| 21 | A10 | INPUT: from pin 53 of PRN code chip accelerator 14 | |
| 22 | OE | INPUT: from pin 24 of PRN code chip accelerator 14 | |
| 23 | A11 | INPUT: from pin 65 of PRN code chip accelerator 14 | |
| 24 | A9 | INPUT: from pin 64 of PRN code chip accelerator 14 | |
| 25 | A8 | INPUT: from pin 63 of PRN code chip accelerator 14 | |
| 26 | A13 | INPUT: from pin of PRN code chip accelerator 14 | ground |
| 27 | WE | INPUT: grounded | write enable |
| 28 | VCC | VCC | power supply |

Figure 4:
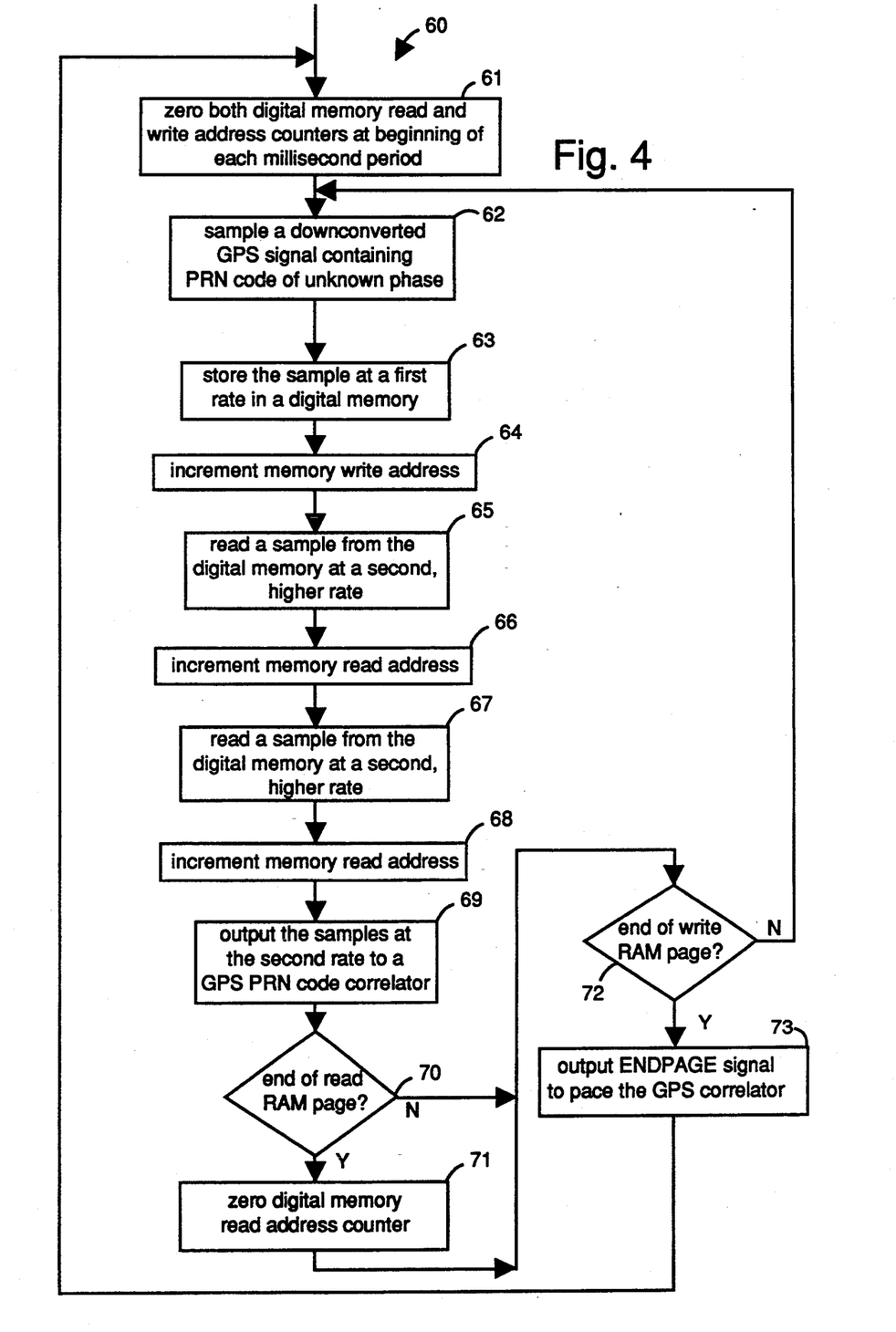
FIG. 4 is a flowchart of a PRN code chip acceleration process embodiment of the present invention.

FIG. 4 illustrates a PRN code chip acceleration process 60, which comprises a series of steps 61–73. Step 61 zeroes a digital memory read and write address counters, e.g., counters 54 and 56 (FIG. 2) at beginning of each millisecond period. Step 62 samples a down-converted GPS signal containing PRN code of unknown phase, e.g., IF IN (FIG. 2). Step 63 stores the sample at a first rate in a digital memory, such as SRAM 18 (FIGS. 1 and 2). Step 64 increments the memory write address, e.g., timing/control unit 52 (FIG. 2). Step 65 reads a sample from the digital memory at a second, higher rate, e.g., timing/control unit 52 (FIG. 2). Step 66 increments the memory read address, e.g., timing/control unit 52 (FIG. 2). Step 67 reads a sample from the digital memory at a second, higher rate. Step 68 increments the memory read address. Step 69 output the samples at the second rate to a GPS PRN code correlator, e.g., PISO SR 48 (FIG. 2). Step 70 tests to see if there is an end of the read RAM page, e.g., timing control unit 52 (FIG. 2). Step 71 zeroes the digital memory read address counter 54. Step 72 tests to see if there is an end of the write RAM page, e.g., timing/control unit 52 (FIG. 2). Step 73 outputs ENDPAGE signal to pace the GPS correlator, e.g., timing/control unit 52 (FIG. 2).

EXPERIMENTAL TESTS

Tests were conducted by the inventor to collect data with and without an embodiment of the present invention fitted to an otherwise conventional GPS receiver. The data is repeated here in Tables VI and VII.

In order to acquire a GPS SV, a conventional GPS receiver needs to find the frequency and CDMA code phase of the signal. Typically, a GPS receiver searches over a range of frequencies and code phases until the signal is found. This search is carried out by mixing the received signal with various frequencies and correlating it with local CDMA code. The correlation interval is typically one millisecond, the periodicity of the CDMA code. Usually, this correlation is done with a "live" signal.

The method for fast acquisition of the present invention increases the number of correlations per millisecond, thereby decreasing the total search time, but does not increase the noisiness of the correlations. For instance, correlations can be performed over a 0.5 millisecond interval to double the number of correlations per millisecond, but there would be a relative increase in noise, because of the decreased amount of data used in the correlation.

One method for fast acquisition is to digitize and store in memory a one millisecond recording of the received signal. This data is then "played back" multiple times at a faster rate, allowing multiple correlations to be performed on the same millisecond of received signal. While this data is being played back at the higher rate, the next millisecond of signal may be digitized and stored in memory for later playback. This scheme reduces the time to acquire a satellite signal by the factor of increased playback speed. For example, if the stored data were played back at twice the rate at which it was recorded, the search time would be cut in half.

In system 10 (FIG. 1), the sampled IF data is played back at twice the rate at which it was recorded. The normal IF signal is sampled at 5.17 MHz and 5170 samples are stored in SRAM. The SRAM 18 is partitioned into two pages, "PAGE A" and "PAGE B", each of which hold one millisecond's run of samples, or 5170 samples. Between each write of data to PAGE A, a pair of samples are read out of PAGE B. PAGE B holds the previous millisecond's samples. When PAGE A has filled up with new data, successive samples are written to PAGE B. The two pages switch their roles, with two samples being read out of PAGE A between writes to PAGE B. This gives a continuous flow of output data at two times the normal rate. This signal is referred to as the "2×IF". The 2×IF is then fed to GPS DSP 16 to be mixed with a local oscillator to move the signal to pseudo-baseband and to correlate it with locally generated CDMA code that is clocked at 2.046 MHz.

A factor of two was chosen for the increase in playback speed. There are two main factors to take into account in deciding the playback rate. (1) GPS DSP 16 must be able to process the data, so the maximum data rate is 25 MHz. Since the data is sampled at 5.17 MHz and an integer factor is desired (to make the hardware simpler), the possible playback rates are 10.34 MHz, 15.51 MHz, and 20.68 MHz. Microprocessor 17 must be able to handle the increased interrupt rate of the channel. It was determined that a two KHz interrupt rate per channel was the maximum that microprocessor 17 could handle. At the two KHz interrupt rate, microprocessor 17 is capable of tracking three channels, but no more. After three channels are being tracked, the interrupt rate must be decreased to one KHz in order to track more satellites.

In order to establish a relationship between the code phase using the 2×IF and the corresponding code phase in the normal IF, the read out of the first data sample from the GPS code chip accelerator 14 SRAM is synchronized to the millisecond. While the 2×IF is useful for performing twice the number of correlations than normal, it is not useful for tracking because of the carrier phase discontinuity in the 2×IF signal. This carrier phase discontinuity occurs because there is a jump in phase between the last data sample and the first data sample in each page in the GPS code chip accelerator 14 SRAM. This problem may be avoided by using the normal IF signal for tracking once power is found using the 2×IF.

GPS DSP 16 clock comes from GPS code chip accelerator 14 and may be either 10.34 MHz, for initial acquisition or re-acquisition, or 5.17 MHz, when tracking more than three satellite carrier signals. In order to track more than three satellites, GPS DSP 16 clock is switched from 10.34 MHz to 5.17 MHz. The information from the 10.34 MHz tracking mode is used to quickly re-acquire and track in the 5.17 MHz mode.

When three satellites or less are being tracked in 5.17 MHz mode, GPS DSP 16 clock may be switched back to 10.34 MHz for fast acquisition and fast re-acquisition.

An expected decrease in acquisition time for a number of satellite carrier signals in a conventional GPS receiver with GPS code chip accelerator 14, versus a conventional GPS receiver, is not necessarily a factor of two, because it is necessary to switch the clock for GPS DSP 16 from 10.34 MHz to 5.17 MHz once three satellite carrier signals are being tracked in 10.34 MHz mode. After the frequency is switched, the search rates in a conventional GPS receiver and a conventional GPS receiver with GPS code chip accelerator 14 are about the same. Thus, a conventional GPS receiver with GPS code chip accelerator 14 will find the first three satellite carrier signals in half the time that it takes a conventional GPS receiver. However, additional satellite carrier signals will be found somewhat faster than in a conventional GPS receiver.

To test this, both a conventional GPS receiver and a conventional GPS receiver with GPS code chip accelerator 14 were set up to search for six satellite carrier signals that were known to be in view. A battery-backed up RAM was cleared, and the time to acquire satellite carrier signals from that point was measured. This test was repeated ten times for each, alternating between a conventional GPS receiver and a conventional GPS receiver with GPS code chip accelerator 14. The satellite carrier signals, their signal levels, and Dopplers at the beginning of the test were:

TABLE III

| PRN | SNC | Doppler (Hz) |
|-----|-----|--------------|
| 3   | 16  | 190          |
| 16  | 9   | −2700        |
| 17  | 19  | 500          |
| 20  | 10  | −3000        |
| 23  | 14  | 2355         |
| 26  | 12  | 974          |

The individual times it took to acquire the satellite carrier signals were recorded. For the conventional GPS receiver alone:

TABLE IV

| No. of SVs | Time To Acquire (Seconds) | Avg. |
|------------|---------------------------|------|
| 1 | 9, 9, 9, 7, 8, 8, 8, 8, 8, 9 | 8.3 |
| 2 | 10, 14, 12, 9, 10, 10, 11, 10, 11, 9 | 10.6 |
| 3 | 16, 17, 15, 13, 15, 14, 14, 15, 15, 15 | 14.9 |
| 4 | 18, 20, 19, 15, 15, 15, 17, 16, 17, 15 | 16.7 |
| 5 | 20, 20, 19, 16, 20, 16, 24, 17, 20, 17 | 18.9 |
| 6 | 25, 25, 25, 24, 23, 26, 75*, 24, 23, 21 | 24.0** |

*missed acquisition on first pass.
**not counting missed acquisition case.

For the conventional GPS receiver with GPS code chip accelerator 14:

TABLE V

| No. of SVs | Time To Acquire (Seconds) | Avg. |
|------------|---------------------------|------|
| 1 | 4, 3, 4, 3, 3, 3, 4, 3, 3, 3 | 3.3 |
| 2 | 5, 5, 5, 4, 3, 4, 4, 4, 3, 3 | 4.0 |
| 3 | 8, 7, 5, 5, 4, 8, 5, 7, 5, 4 | 5.8 |
| 4 | 10, 7, 11, 9, 10, 13, 7, 12, 10, 10 | 9.9 |
| 5 | 11, 14, 12, 12, 14, 15, 10, 14, 15, 16 | 13.3 |
| 6 | 13, 16, 16, 14, 17, 18, 15, 17, 19, 20 | 16.5 |

This data shows that, for this specific case, the average time for a conventional GPS receiver to get three satellite carrier signals was 14.9 seconds versus 5.8 seconds for a conventional GPS receiver with GPS code chip accelerator 14 (a factor of 2.5). For six satellite carrier signals, a conventional GPS receiver took twenty-four seconds, versus 16.5 seconds for a conventional GPS receiver with GPS code chip accelerator 14 (a factor of 1.5). For the three satellite carrier signals case, the decrease in acquisition time was greater than the expected factor of two. This improvement is due to a decrease in total search time because of a more time-efficient search algorithm that was implemented in the conventional GPS receiver with GPS code chip accelerator 14.

Hardware for a method for fast acquisition was developed and put on a conventional GPS receiver. This hardware consisted of an Altera EPM5128 and a 16K byte SRAM. Due to limited microprocessing power, only a playback rate of two times is feasible, and even then, the GPS DSP 16 clock must be switched from 10.34 MHz to 5.17 MHz after three satellite carrier signals are being tracked to avoid overloading the processor.

The testing showed the improvement in acquisition time for one specific case, down to 5.8 seconds from 14.9 seconds for three satellite carrier signals, and down to 16.5 seconds from 24 seconds for 6 satellite carrier signals.

Fast Re-acquisition Technique

A fast re-acquisition strategy may be successfully employed on otherwise conventional GPS receivers. After a GPS receiver acquires a satellite signal, it may temporarily lose lock due to some physical obstruction between the receiver and the satellite, e.g. the user drives by a very tall building. Rather than resuming a search over a range of code phases, it is preferable to use information from a last lock to predict a new code phase. This makes for fast re-acquisition once an obstruction is out of the way. This strategy may be combined with the fast acquisition methods described herein in a conventional GPS receiver. This may be useful when using a system in a car driven in an urban environment. Often, satellite signals are obstructed by buildings, but they are available for a short time while passing through an intersection.

Assuming that a receiver, such as receiver 10, is in 5.17 MHz mode, once less than three satellite carrier signals are being tracked, the receiver preferably reconfigures itself for fast acquisition by switching the GPS DSP 16 clock back to 10.34 MHz. It sets the carrier NCO to the value for which re-acquisition is expected. The CDMA code phase is also moved to the appropriate position for re-acquisition. A narrow code search is performed, searching plus or minus ten chips from the predicted code phase. Every thirteen milliseconds, a new predicted CDMA code phase is calculated and the center of the narrow code phase search is moved to that new phase. This code phase adjustment is based on the Doppler frequency of the last lock and is commonly known as "Doppler aiding." At some point, the receiver 10 should give up the narrow code search, so if after one minute, a signal is not found, a wide code phase search takes over.

To test this fast re-acquisition strategy, a conventional GPS receiver and a conventional GPS receiver with GPS code chip accelerator 14 and fast re-acquisition, such as receiver 10, were driven through a downtown area. Each unit had its own antenna, mounted on the roof of a car. Data was logged using a CMT data logger set up to log two-dimensional or three-dimensional positions every second and raw measurements every 9999 seconds (nearly three hours). Raw measurements were not taken because the CMT data logger would have difficulty obtaining both the measurement data and position data.

During the road test, three satellite vehicles (SV's) were up: "4", "15" and "25". With only three SV's, there can be no constellation changes, since there is only one constellation that can give a position. Therefore no more than three SV's can be tracked, which leaves ample time for position calculations.

Over a ten minute test, a conventional GPS receiver without GPS code chip accelerator 14 and fast re-acquisition missed seven positions at times where the conventional GPS receiver with GPS code chip accelerator 14 and fast re-acquisition was able to get positions. There were eight periods when both missed positions. The durations of these outages varied from one to eight seconds. An example of this log data follows. Table VI is from the log of the conventional GPS receiver and Table VII is from the conventional GPS receiver with GPS code chip accelerator 14 and fast re-acquisition.

TABLE VI

Test Data obtained with a Conventional GPS Receiver Only

| TIME | EASTING (m) | NORTHING (m) | Height Above Reference Ellipsoid (m) |
|---|---|---|---|
| 00:54:41 | 4132505.545 | 598791.896 | −2.683 |
| 00:54:42 | 4132501.814 | 598793.839 | −2.680 |
| 00:54:43 | 4132499.878 | 598794.689 | −2.679 |
| 00:54:44 | 4132499.260 | 598794.708 | −2.677 |
| 00:54:45 | 4132499.246 | 598794.398 | −2.677 |
| 00:54:46 | 4132499.298 | 598794.011 | −2.677 |
| 00:54:47 | 4132499.337 | 598793.667 | −2.677 |
| 00:54:48 | 4132499.529 | 598793.244 | −2.677 |
| 00:54:49 | 4132498.678 | 598793.420 | −2.679 |
| 00:54:50 | 4132495.359 | 598795.088 | −2.683 |
| 00:54:51 | 4132490.203 | 598797.836 | −2.686 |
| 00:54:52 | 4132483.981 | 598801.214 | −2.688 |
| 00:54:53 | 4132476.554 | 598805.309 | −2.689 |
| 00:54:54 | 4132468.435 | 598809.756 | −2.690 |
| 00:54:55 | 4132459.855 | 598814.417 | −2.691 |
| 00:54:56 | 4132450.652 | 598819.516 | −2.692 |
| 00:54:57 | 4132441.414 | 598824.364 | −2.692 |
| 00:54:58 | 4132432.358 | 598829.004 | −2.691 |
| 00:55:05 | 4132401.341 | 598841.598 | −2.682 |
| 00:55:06 | 4132397.608 | 598840.982 | −2.683 |
| 00:55:07 | 4132390.916 | 598838.424 | −2.684 |
| 00:55:08 | 4132384.512 | 598832.836 | −2.687 |
| 00:55:09 | 4132378.136 | 598826.754 | −2.687 |
| 00:55:10 | 4132371.403 | 598820.056 | −2.688 |
| 00:55:11 | 4132364.594 | 598813.127 | −2.688 |
| 00:55:19 | 4132340.770 | 598776.948 | −2.741 |
| 00:55:20 | 4132340.980 | 598776.416 | −2.679 |
| 00:55:21 | 4132341.071 | 598775.986 | −2.679 |
| 00:55:22 | 4132340.045 | 598774.096 | −2.682 |
| 00:55:23 | 4132338.124 | 598769.030 | −2.682 |
| 00:55:24 | 4132334.966 | 598762.603 | −2.685 |
| 00:55:25 | 4132331.100 | 598755.141 | −2.686 |
| 00:55:26 | 4132326.432 | 598746.364 | −2.687 |
| 00:55:27 | 4132321.320 | 598737.428 | −2.688 |
| 00:55:28 | 4132316.301 | 598728.394 | −2.687 |
| 00:55:29 | 4132311.489 | 598719.537 | −2.687 |
| 00:55:30 | 4132307.175 | 598711.023 | −2.686 |
| 00:55:32 | 4132299.133 | 598697.165 | −2.685 |
| 00:55:33 | 4132296.359 | 598691.225 | −2.684 |
| 00:55:34 | 4132294.035 | 598686.085 | −2.683 |
| 00:55:35 | 4132292.178 | 598681.698 | −2.682 |
| 00:55:36 | 4132290.971 | 598678.426 | −2.681 |
| 00:55:37 | 4132290.608 | 598676.766 | −2.680 |
| 00:55:38 | 4132290.787 | 598675.891 | −2.679 |
| 00:55:39 | 4132290.967 | 598675.106 | −2.679 |
| 00:55:40 | 4132291.242 | 598674.494 | −2.679 |
| 00:55:41 | 4132291.485 | 598673.932 | −2.679 |
| 00:55:42 | 4132291.973 | 598673.382 | −2.679 |
| 00:55:43 | 4132292.383 | 598672.721 | −2.679 |
| 00:55:44 | 4132291.483 | 598670.174 | −2.682 |
| 00:55:45 | 4132289.182 | 598665.258 | −2.687 |
| 00:55:46 | 4132285.770 | 598658.592 | −2.688 |
| 00:55:47 | 4132281.931 | 598651.229 | −2.689 |
| 00:55:48 | 4132276.636 | 598642.995 | −2.691 |
| 00:55:49 | 4132270.704 | 598634.078 | −2.692 |
| 00:55:50 | 4132264.923 | 598625.086 | −2.692 |
| 00:55:51 | 4132259.085 | 598615.921 | −2.692 |
| 00:55:52 | 4132253.114 | 598606.458 | −2.692 |
| 00:55:56 | 4132228.493 | 598567.286 | −2.751 |
| 00:55:57 | 4132222.683 | 598557.119 | −2.692 |
| 00:55:58 | 4132216.437 | 598547.023 | −2.693 |
| 00:55:59 | 4132210.096 | 598536.897 | −2.692 |
| 00:56:00 | 4132203.810 | 598526.710 | −2.692 |
| 00:56:01 | 4132198.234 | 598516.146 | −2.692 |
| 00:56:02 | 4132193.061 | 598507.058 | −2.699 |
| 00:56:03 | 4132187.835 | 598497.571 | −2.691 |
| 00:56:04 | 4132183.273 | 598489.416 | −2.689 |
| 00:56:05 | 4132179.840 | 598482.974 | −2.687 |
| 00:56:06 | 4132177.819 | 598478.694 | −2.685 |
| 00:56:07 | 4132177.077 | 598476.073 | −2.684 |
| 00:56:08 | 4132176.639 | 598471.566 | −2.683 |
| 00:56:09 | 4132178.307 | 598465.414 | −2.679 |

TABLE VI-continued

Test Data obtained with a Conventional GPS Receiver Only

| TIME | EASTING (m) | NORTHING (m) | Height Above Reference Ellipsoid (m) |
|---|---|---|---|
| 00:56:10 | 4132182.333 | 598459.022 | −2.675 |
| 00:56:11 | 4132189.016 | 598452.242 | −2.670 |
| 00:56:12 | 4132198.383 | 598446.033 | −2.666 |
| 00:56:13 | 4132208.638 | 598440.175 | −2.665 |
| 00:56:14 | 4132220.075 | 598433.692 | −2.664 |
| 00:56:15 | 4132232.256 | 598426.618 | −2.663 |
| 00:56:16 | 4132244.871 | 598419.151 | −2.666 |
| 00:56:17 | 4132256.992 | 598412.163 | −2.668 |
| 00:56:18 | 4132269.559 | 598404.582 | −2.666 |
| 00:56:19 | 4132282.032 | 598396.964 | −2.666 |
| 00:56:20 | 4132295.030 | 598389.333 | −2.666 |
| 00:56:21 | 4132307.863 | 598381.578 | −2.665 |
| 00:56:22 | 4132320.700 | 598373.835 | −2.666 |
| 00:56:23 | 4132333.547 | 598366.219 | −2.665 |
| 00:56:24 | 4132346.232 | 598358.803 | −2.666 |
| 00:56:25 | 4132358.605 | 598351.557 | −2.666 |
| 00:56:26 | 4132370.551 | 598344.600 | −2.667 |
| 00:56:27 | 4132382.121 | 598337.845 | −2.668 |
| 00:56:28 | 4132392.539 | 598331.343 | −2.670 |
| 00:56:29 | 4132401.333 | 598324.471 | −2.672 |
| 00:56:30 | 4132408.166 | 598316.373 | −2.676 |
| 00:56:31 | 4132412.827 | 598306.676 | −2.679 |
| 00:56:32 | 4132416.287 | 598296.348 | −2.681 |
| 00:56:33 | 4132420.598 | 598286.468 | −2.678 |
| 00:56:34 | 4132427.032 | 598277.505 | −2.675 |
| 00:56:35 | 4132435.521 | 598268.602 | −2.672 |
| 00:56:36 | 4132445.192 | 598259.814 | −2.670 |
| 00:56:37 | 4132455.570 | 598250.847 | −2.669 |
| 00:56:38 | 4132466.292 | 598248.835 | −2.668 |
| 00:56:39 | 4132477.451 | 598242.202 | −2.668 |
| 00:56:40 | 4132488.536 | 598235.634 | −2.668 |
| 00:56:41 | 4132499.420 | 598229.267 | −2.668 |
| 00:56:42 | 4132509.767 | 598223.481 | −2.670 |
| 00:56:43 | 4132519.041 | 598218.566 | −2.672 |
| 00:56:44 | 4132527.086 | 598214.560 | −2.674 |
| 00:56:48 | 4132557.571 | 598194.314 | −2.587 |
| 00:56:49 | 4132559.645 | 598193.009 | −2.676 |
| 00:56:50 | 4132560.508 | 598191.766 | −2.685 |
| 00:56:55 | 4132584.946 | 598176.749 | −2.670 |
| 00:56:56 | 4132595.670 | 598171.129 | −2.666 |
| 00:56:57 | 4132605.661 | 598164.560 | −2.666 |
| 00:56:58 | 4132616.223 | 598157.344 | −2.665 |
| 00:56:59 | 4132626.947 | 598150.057 | −2.665 |
| 00:57:00 | 4132637.372 | 598143.403 | −2.666 |
| 00:57:01 | 4132646.671 | 598137.780 | −2.668 |
| 00:57:02 | 4132654.410 | 598133.330 | −2.671 |
| 00:57:03 | 4132660.257 | 598125.925 | −2.674 |
| 00:57:04 | 4132663.815 | 598119.355 | −2.678 |
| 00:57:05 | 4132664.785 | 598111.728 | −2.682 |
| 00:57:06 | 4132663.261 | 598104.053 | −2.686 |
| 00:57:07 | 4132660.479 | 598097.351 | −2.687 |
| 00:57:08 | 4132656.959 | 598091.690 | −2.689 |
| 00:57:09 | 4132653.016 | 598086.480 | −2.689 |
| 00:57:10 | 4132649.514 | 598081.493 | −2.688 |
| 00:57:11 | 4132646.389 | 598076.705 | −2.687 |
| 00:57:12 | 4132643.579 | 598072.548 | −2.687 |
| 00:57:13 | 4132640.823 | 598068.149 | −2.687 |
| 00:57:14 | 4132637.680 | 598063.031 | −2.688 |
| 00:57:15 | 4132634.136 | 598056.962 | −2.688 |
| 00:57:16 | 4132630.198 | 598050.153 | −2.689 |
| 00:57:17 | 4132626.032 | 598043.245 | −2.689 |
| 00:57:18 | 4132621.588 | 598036.207 | −2.689 |
| 00:57:19 | 4132617.209 | 598028.420 | −2.689 |
| 00:57:20 | 4132612.921 | 598020.167 | −2.689 |
| 00:57:21 | 4132609.195 | 598011.758 | −2.688 |
| 00:57:22 | 4132605.561 | 598004.659 | −2.688 |
| 00:57:23 | 4132602.292 | 597998.913 | −2.687 |
| 00:57:24 | 4132599.798 | 597994.727 | −2.686 |
| 00:57:25 | 4132598.010 | 597991.972 | −2.685 |
| 00:57:26 | 4132597.005 | 597990.500 | −2.684 |
| 00:57:27 | 4132596.544 | 597989.840 | −2.683 |

TABLE VII

Conventional GPS receiver with GPS code chip accelerator 14

| TIME | EASTING (m) | NORTHING (m) | Height Above Reference Ellipsoid (m) |
|---|---|---|---|
| 00:54:53 | 4132419.045 | 598823.816 | −2.695 |
| 00:54:54 | 4132410.912 | 598827.883 | −2.697 |
| 00:54:55 | 4132402.765 | 598832.194 | −2.697 |
| 00:54:56 | 4132394.580 | 598836.354 | −2.697 |
| 00:54:57 | 4132386.344 | 598840.563 | −2.697 |
| 00:54:58 | 4132378.057 | 598844.823 | −2.697 |
| 00:55:05 | 4132405.729 | 598847.394 | −2.594 |
| 00:55:06 | 4132401.936 | 598846.633 | −2.689 |
| 00:55:07 | 4132396.592 | 598843.230 | −2.691 |
| 00:55:08 | 4132391.283 | 598838.473 | −2.692 |
| 00:55:09 | 4132385.847 | 598833.694 | −2.692 |
| 00:55:10 | 4132380.326 | 598828.910 | −2.692 |
| 00:55:11 | 4132374.757 | 598824.167 | −2.692 |
| 00:55:12 | 4132369.140 | 598819.467 | −2.693 |
| 00:55:18 | 4132335.050 | 598778.314 | −2.792 |
| 00:55:19 | 4132335.129 | 598777.995 | −2.683 |
| 00:55:20 | 4132335.523 | 598777.424 | −2.683 |
| 00:55:21 | 4132335.811 | 598776.902 | −2.683 |
| 00:55:22 | 4132335.371 | 598773.906 | −2.685 |
| 00:55:23 | 4132333.057 | 598768.579 | −2.688 |
| 00:55:24 | 4132329.871 | 598761.903 | −2.691 |
| 00:55:25 | 4132325.969 | 598754.175 | −2.692 |
| 00:55:26 | 4132321.258 | 598745.149 | −2.694 |
| 00:55:27 | 4132316.133 | 598736.223 | −2.694 |
| 00:55:28 | 4132311.031 | 598727.359 | −2.694 |
| 00:55:29 | 4132305.913 | 598718.555 | −2.694 |
| 00:55:30 | 4132300.714 | 598709.788 | −2.694 |
| 00:55:32 | 4132295.144 | 598694.637 | −2.707 |
| 00:55:33 | 4132293.834 | 598691.781 | −2.690 |
| 00:55:34 | 4132291.619 | 598686.611 | −2.689 |
| 00:55:35 | 4132289.743 | 598682.288 | −2.689 |
| 00:55:36 | 4132288.647 | 598678.993 | −2.687 |
| 00:55:37 | 4132288.351 | 598677.360 | −2.686 |
| 00:55:38 | 4132288.592 | 598676.478 | −2.685 |
| 00:55:39 | 4132288.810 | 598675.690 | −2.686 |
| 00:55:40 | 4132289.144 | 598675.032 | −2.685 |
| 00:55:41 | 4132289.442 | 598674.468 | −2.685 |
| 00:55:42 | 4132289.983 | 598673.898 | −2.685 |
| 00:55:43 | 4132290.443 | 598673.226 | −2.685 |
| 00:55:44 | 4132289.581 | 598670.568 | −2.688 |
| 00:55:45 | 4132287.276 | 598665.568 | −2.690 |
| 00:55:46 | 4132283.870 | 598658.848 | −2.691 |
| 00:55:47 | 4132280.065 | 598651.434 | −2.692 |
| 00:55:48 | 4132275.615 | 598642.360 | −2.692 |
| 00:55:49 | 4132270.607 | 598632.695 | −2.695 |
| 00:55:50 | 4132266.454 | 598622.352 | −2.692 |
| 00:55:51 | 4132262.220 | 598612.076 | −2.692 |
| 00:55:52 | 4132257.904 | 598601.871 | −2.693 |
| 00:55:56 | 4132239.598 | 598556.431 | −2.737 |
| 00:55:57 | 4132235.079 | 598545.049 | −2.694 |
| 00:55:58 | 4132230.490 | 598533.353 | −2.699 |
| 00:55:59 | 4132227.100 | 598521.833 | −2.695 |
| 00:56:00 | 4132222.392 | 598509.002 | −2.699 |
| 00:56:01 | 4132216.118 | 598499.092 | −2.699 |
| 00:56:02 | 4132210.164 | 598489.273 | −2.699 |
| 00:56:03 | 4132204.645 | 598480.151 | −2.698 |
| 00:56:04 | 4132199.837 | 598472.448 | −2.697 |
| 00:56:05 | 4132196.206 | 598466.466 | −2.695 |
| 00:56:06 | 4132194.015 | 598462.684 | −2.692 |
| 00:56:07 | 4132193.042 | 598460.452 | −2.691 |
| 00:56:08 | 4132192.316 | 598456.060 | −2.690 |
| 00:56:09 | 4132193.914 | 598450.061 | −2.685 |
| 00:56:10 | 4132197.870 | 598443.931 | −2.682 |
| 00:56:11 | 4132204.493 | 598437.419 | −2.677 |
| 00:56:12 | 4132213.808 | 598431.513 | −2.673 |
| 00:56:13 | 4132222.101 | 598425.846 | −2.678 |
| 00:56:14 | 4132232.014 | 598419.492 | −2.669 |
| 00:56:15 | 4132244.058 | 598412.599 | −2.670 |
| 00:56:16 | 4132253.562 | 598405.179 | −2.674 |
| 00:56:17 | 4132266.344 | 598396.486 | −2.669 |
| 00:56:18 | 4132277.493 | 598389.105 | −2.669 |
| 00:56:19 | 4131999.061 | 598656.421 | −2.800 |
| 00:56:20 | 4132081.031 | 598583.222 | −2.661 |
| 00:56:21 | 4132098.146 | 598571.650 | −2.662 |

TABLE VII-continued

Conventional GPS receiver with GPS code chip accelerator 14

| TIME | EASTING (m) | NORTHING (m) | Height Above Reference Ellipsoid (m) |
|---|---|---|---|
| 00:56:22 | 4132115.184 | 598560.165 | −2.662 |
| 00:56:23 | 4132132.150 | 598548.888 | −2.662 |
| 00:56:24 | 4132148.858 | 598537.881 | −2.662 |
| 00:56:25 | 4132165.150 | 598527.138 | −2.663 |
| 00:56:26 | 4132177.308 | 598520.065 | −2.672 |
| 00:56:27 | 4132192.466 | 598509.811 | −2.662 |
| 00:56:28 | 4132206.998 | 598499.956 | −2.669 |
| 00:56:29 | 4132219.456 | 598489.705 | −2.672 |
| 00:56:30 | 4132229.801 | 598478.193 | −2.676 |
| 00:56:31 | 4132237.818 | 598465.151 | −2.680 |
| 00:56:32 | 4132244.668 | 598451.691 | −2.681 |
| 00:56:33 | 4132252.516 | 598438.779 | −2.678 |
| 00:56:34 | 4132262.529 | 598426.947 | −2.675 |
| 00:56:35 | 4132274.434 | 598418.776 | −2.672 |
| 00:56:36 | 4132287.290 | 598412.996 | −2.671 |
| 00:56:37 | 4132300.841 | 598404.585 | −2.670 |
| 00:56:38 | 4132314.811 | 598395.187 | −2.669 |
| 00:56:39 | 4132329.014 | 598385.688 | −2.669 |
| 00:56:40 | 4132342.987 | 598380.025 | −2.669 |
| 00:56:41 | 4132356.752 | 598372.426 | −2.670 |
| 00:56:42 | 4132369.835 | 598365.325 | −2.671 |
| 00:56:43 | 4132381.774 | 598359.088 | −2.673 |
| 00:56:44 | 4132392.483 | 598355.559 | −2.675 |
| 00:56:45 | 4132401.451 | 598351.960 | −2.679 |
| 00:56:46 | 4132409.245 | 598345.885 | −2.683 |
| 00:56:47 | 4132414.258 | 598341.017 | −2.684 |
| 00:56:48 | 4132419.534 | 598336.036 | −2.682 |
| 00:56:49 | 4132423.952 | 598334.607 | −2.685 |
| 00:56:50 | 4132415.339 | 598884.301 | −2.703 |
| 00:56:55 | 4129448.538 | 598951.954 | −12.259 |
| 00:56:56 | 4129039.622 | 598926.723 | −3.353 |
| 00:56:57 | 4129789.983 | 598939.280 | 0.404 |
| 00:56:58 | 4129856.636 | 598926.802 | −2.646 |
| 00:56:59 | 4129894.816 | 598922.018 | −2.735 |
| 00:57:00 | 4129959.520 | 598919.129 | −2.649 |
| 00:57:01 | 4130023.101 | 598916.161 | −2.651 |
| 00:57:02 | 4130085.574 | 598913.135 | −2.653 |
| 00:57:03 | 4130135.499 | 598896.004 | −2.662 |
| 00:57:04 | 4130189.392 | 598874.618 | −2.667 |
| 00:57:05 | 4130239.714 | 598852.433 | −2.673 |
| 00:57:06 | 4130286.553 | 598830.504 | −2.678 |
| 00:57:07 | 4130331.176 | 598809.801 | −2.681 |
| 00:57:08 | 4130374.118 | 598790.405 | −2.684 |
| 00:57:09 | 4130415.700 | 598771.716 | −2.686 |
| 00:57:10 | 4130456.822 | 598753.506 | −2.687 |
| 00:57:11 | 4130497.396 | 598735.792 | −2.687 |
| 00:57:12 | 4130537.425 | 598718.920 | −2.688 |
| 00:57:13 | 4130576.669 | 598702.059 | −2.690 |

There were times at which positions were logged by the conventional GPS receiver with GPS code chip accelerator 14 and fast re-acquisition, but not by a conventional GPS receiver. The satellite signals were occasionally being obstructed by buildings and a conventional GPS receiver with GPS code chip accelerator 14 and fast re-acquisition was able to re-acquire the signal and log a position more quickly than the conventional GPS receiver.

The use of the narrow code search gives the bulk of the gain in fast re-acquisition. The use of GPS code chip accelerator 14 in a narrow code search actually has a negative effect. The gain of performing a narrow code search at 10.34 MHz versus 5.17 MHz is minimal, yet there is all the overhead of the switch from 10.34 MHz to 5.17 MHz once the signals are found. This overhead more than wipes out the small gain. Thus, re-acquisition time using a narrow code search would be smaller without the use of GPS code chip accelerator 14.

A narrow code search strategy for fast re-acquisition was implemented on a conventional GPS receiver, but it was conducted at 10.34 MHz. In fact, it would have been faster if it were done at 5.17 MHz. A road test suggested that there are gains to the fast re-acquisition strategy in an urban environment. A narrow code search without the use of GPS code chip accelerator 14 would have been more effective.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of increasing the speed of correlation code searches through pseudo-random number (PRN) codes transmitted by global positioning system (GPS) satellites on carrier signals, the method comprising the steps of:

sampling a first signal including said PRN codes transmitted from said GPS satellites at a first real-time rate which is consistent with transmitted PRN code bandwidths;

storing said samples in a digital memory at said first rate;

reading said samples from said digital memory at a second rate that is substantially faster than said first rate; and outputting said samples at said second rate to a digital signal processor operating at said second rate for code searching and locking.

2. The method of claim 1, wherein:

the sampling of the first signal is approximately five megahertz; and the outputting of said samples read from said memory is approximately ten megahertz.

3. The method of claim 1, wherein:

the storing includes a serial-to-parallel conversion of said samples five bits wide; and the reading includes a parallel-to-serial conversion of said samples stored in said memory five bits wide.

4. A pseudo-random number (PRN) code chip acceleration process for a GPS receiver, the process comprising the steps of:

zeroing a pair of digital write and read memory address counters at beginning of a millisecond period;

real-time sampling a down-converted GPS signal containing PRN code of unknown phase;

storing said sample at a first rate in said digital memory at a memory write address which is consistent with transmitted PRN code bandwidths;

incrementing said memory write address;

reading a sample from said digital memory at a second, higher rate from a memory read address;

incrementing said memory read address;

reading a next sample from said digital memory at said second rate;

incrementing said memory read address; and outputting said samples at said second rate to a GPS PRN code correlator.

5. A GPS receiver, comprising:

GPS downconverter means for producing an intermediate frequency (IF) output containing pseudo-random number (PRN) code of unknown phase from a carrier signal received from a GPS satellite vehicle (SV);

PRN code chip acceleration means for sampling said IF output at a first rate which is consistent with transmitted PRN code bandwidths and for outputting said samples at a second, substantially higher rate; and GPS PRN code correlation means for processing said samples at said second rate.

6. The receiver of claim 5, wherein:

PRN code chip acceleration means further comprises interfacing means for storing said samples in a random access memory (RAM) connected to both the GPS downconverter and the GPS PRN code correlation means.

7. The receiver of claim 5, wherein:

PRN code chip acceleration means further comprises output clocking means for clocking the GPS PRN code correlation means at said second rate.

8. The receiver of claim 5, wherein:

the PRN code chip acceleration means further comprises interfacing means for storing said samples in a random access memory (RAM); serial in-to-parallel out digital conversion means for collecting said samples into digital words for storage in said RAM; and parallel in-to-serial out digital conversion means for reading said samples stored as digital words in said RAM and producing a serial output stream of said samples.

9. The receiver of claim 8, wherein:

said serial in-to-parallel out (SIPO) digital conversion means is a five-bit parallel-out type; and said parallel-to-serial conversion means is a five-bit parallel-in type.

10. The receiver of claim 9, wherein:

said first rate is approximately five megahertz; and
said second rate is at least twice said first rate.

* * * * *